US012111216B2

(12) United States Patent
Cao et al.

(10) Patent No.: US 12,111,216 B2
(45) Date of Patent: Oct. 8, 2024

(54) TEMPERATURE SENSOR CIRCUIT

(71) Applicant: INNOGRIT TECHNOLOGIES CO., LTD., Shanghai (CN)

(72) Inventors: Chi Cao, Shanghai (CN); Guanyu Qian, Davis, CA (US); Kangmin Hu, Santa Clara, CA (US)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 466 days.

(21) Appl. No.: 17/537,679

(22) Filed: Nov. 30, 2021

(65) Prior Publication Data

US 2023/0119770 A1 Apr. 20, 2023

(30) Foreign Application Priority Data

Oct. 18, 2021 (CN) ......................... 202111209484.7

(51) Int. Cl.
*G01K 7/18* (2006.01)
*G01K 7/20* (2006.01)
*G01K 7/24* (2006.01)

(52) U.S. Cl.
CPC ............... *G01K 7/18* (2013.01); *G01K 7/203* (2013.01); *G01K 7/245* (2013.01)

(58) Field of Classification Search
CPC ........ G01K 7/18; G01K 2219/00; G01K 7/01; G01K 7/203; G01K 7/245
See application file for complete search history.

(56) References Cited

U.S. PATENT DOCUMENTS 4,453,834 A * 6/1984 Suzuki ....................... G04F 5/06 331/111
6,281,760 B1 * 8/2001 Koelling .............. H03K 3/0315 331/66

(Continued)

FOREIGN PATENT DOCUMENTS

CN 103645770 A 3/2014
CN 107356347 A 11/2017

(Continued)

*Primary Examiner* — Nathaniel T Woodward
*Assistant Examiner* — Philip L Cotey
(74) *Attorney, Agent, or Firm* — LEYDIG, VOIT & MAYER, LTD.

(57) ABSTRACT

A temperature sensor circuits includes a temperature sensing module, a current generator, a current controlled oscillator, and a counter. The temperature sensing module is sensitive to temperature changes. The current generator respectively generates a positive temperature coefficient current positively related to temperature and a negative temperature coefficient current negatively related to temperature according to the temperature sensed by the temperature induction module. The current controlled oscillator oscillates according to the positive and the negative temperature coefficient currents respectively and outputs a positive and negative temperature coefficient oscillation signals. The counter receives a clock signal and calculates a first period accumulation number of the negative temperature coefficient oscillation signal and a second period accumulation number of the positive temperature coefficient oscillation signal in the same number of clock periods respectively, and acquires a temperature value based on the period accumulation numbers.

12 Claims, 5 Drawing Sheets

(56) References Cited

U.S. PATENT DOCUMENTS

| | | | | |
|---|---|---|---|---|
| 8,136,987 | B2 * | 3/2012 | Luria | G01K 7/01 327/512 |
| 8,959,994 | B2 * | 2/2015 | Tai | G01K 7/01 73/204.17 |
| 9,791,488 | B2 * | 10/2017 | Tai | G01R 27/2605 |
| 10,938,356 | B2 * | 3/2021 | Michel | H03F 3/45475 |
| 2003/0156622 | A1 * | 8/2003 | Gold | G01K 7/01 374/170 |
| 2004/0032246 | A1 * | 2/2004 | Motz | G01D 5/2448 324/117 R |
| 2004/0062292 | A1 * | 4/2004 | Pennock | G01K 7/015 374/170 |
| 2004/0071183 | A1 * | 4/2004 | Tesi | G01K 7/01 374/1 |
| 2006/0017519 | A1 * | 1/2006 | Pernia | H03L 7/24 331/185 |
| 2008/0100350 | A1 * | 5/2008 | Pernia | H03B 5/1243 331/181 |
| 2009/0059999 | A1 * | 3/2009 | Shoda | G01K 7/01 374/185 |
| 2009/0315749 | A1 * | 12/2009 | McCoy | H03M 1/60 341/155 |
| 2010/0237955 | A1 * | 9/2010 | Mahooti | H03K 3/0231 331/66 |
| 2011/0200070 | A1 * | 8/2011 | Makinwa | H03M 1/14 374/170 |
| 2014/0086279 | A1 * | 3/2014 | Cao | G01K 1/026 374/183 |
| 2017/0016776 | A1 * | 1/2017 | Ma | H03K 17/687 |
| 2017/0363668 | A1 * | 12/2017 | Tai | G01K 7/01 |
| 2018/0069531 | A1 * | 3/2018 | Wang | H03K 3/0231 |
| 2019/0064007 | A1 * | 2/2019 | Lesso | G01K 7/32 |
| 2019/0353534 | A1 * | 11/2019 | Mordakhay | G01K 7/226 |
| 2020/0182707 | A1 | 6/2020 | Badets et al. | |
| 2021/0003460 | A1 * | 1/2021 | Cobb | G01L 1/144 |
| 2021/0131878 | A1 * | 5/2021 | Lesso | G01K 7/32 |

FOREIGN PATENT DOCUMENTS

| | | | |
|---|---|---|---|
| CN | 108123699 | A | 6/2018 |
| CN | 109060162 | A | 12/2018 |
| CN | 109632117 | A | 4/2019 |

* cited by examiner

TEMPERATURE SENSOR CIRCUIT

CROSS-REFERENCE TO PRIOR APPLICATION

Priority is claimed to Chinese Patent Application No. CN 2021112094847, filed on Oct. 18, 2021, the entire disclosure of which is hereby incorporated by reference herein.

FIELD

The present invention relates to the technical field of integrated circuits, in particular to a temperature sensor circuit.

BACKGROUND

This section is intended to provide a background or context for embodiments of the present invention. The description here is not an admission of prior art by its inclusion in this section.

System on chip (SoC) is an integrated circuit chip, which comprises a central processing unit (CPU), a graphics processing unit (GPU) and other chips. The higher the temperature on the SoC chip, the worse the processing performance of the SoC chip. When the temperature on the SoC chip exceeds a certain threshold, the SoC chip may fail to work normally. A temperature sensor is deployed to the SoC to measure its internal temperature, so as to adjust the working frequency of subsystem in the SoC chip and ensure the performance of the SoC chip.

With the development of semiconductor technology, the size of chip shrinks, the number of transistors increases, and the power density per unit size also increases. It leads to the self-heating phenomenon of the chip, which becomes more and more pronounced. The above phenomena are prominent in FinFet process and Silicon-On-Insulator (SOI) substrate process, which seriously affects the stability of the chip under high load. Therefore, high-speed and medium-precision on-chip temperature detection is needed in modern SoC to dynamically adjust the working voltage and frequency of the system and seek the best balance between high performance and high stability. In addition to the above characteristics of high-speed and medium-precision, the ideal temperature sensor on modern SoC should also have the characteristics of low power consumption and small area. The low-power temperature sensor itself will not significantly heat up part of the chip and induce measurement errors. The small-area temperature sensor can be repeatedly deployed in different functional areas of a large-scale and complex SoC to achieve a more detailed balance of performance and stability.

The temperature sensors in the SoC chip usually comprise bipolar junction transistors (BJT), a current generator, a charge pump and a comparator. The temperature sensor generates a current signal which changes positively with the temperature and a current signal which changes negatively with the temperature. The two current signals are periodically charged and discharged to the capacitor by the charge pump, and the comparator compares the voltage of the capacitor, and finally obtains a temperature value according to the charging and discharging period of the capacitor. On one hand, conversion time of the traditional scheme is pretty long. On the other hand, the transistor in the charge pump needs to consume charge carriers when switching from non-working state to working state, which leads to mismatch between the positive and negative current signals and reduces the measurement accuracy.

SUMMARY

In an embodiment of the present invention, there is provided a temperature sensor circuit which comprises: a temperature sensing module which is sensitive to temperature changes; a current generator configured to generate a positive temperature coefficient current positively related to temperature and a negative temperature coefficient current negatively related to temperature according to the temperature sensed by the temperature sensing module respectively; a current controlled oscillator configured to oscillate according to the positive temperature coefficient current and the negative temperature coefficient current respectively, and to output a positive temperature coefficient oscillation signal and a negative temperature coefficient oscillation signal; and a counter configured to receive a clock signal and calculate a first period accumulation number of the negative temperature coefficient oscillation signal and a second period accumulation number of the positive temperature coefficient oscillation signal in the same number of clock signal periods respectively, and to acquire a temperature value based on the first period accumulation number and the second period accumulation number.

BRIEF DESCRIPTION OF THE FIGURES

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

In the following description, numerous technical details are set forth in order to provide the reader with a better understanding of the present application. However, those skilled in the art can understand that the technical solutions claimed in the present application can be implemented without these technical details and various changes and modifications based on the following embodiments.

In order to make the objects, technical solutions and advantages of the present application clearer, embodiments of the present application will be further described in detail below with reference to the accompanying drawings.

Embodiment I

Figure 1:
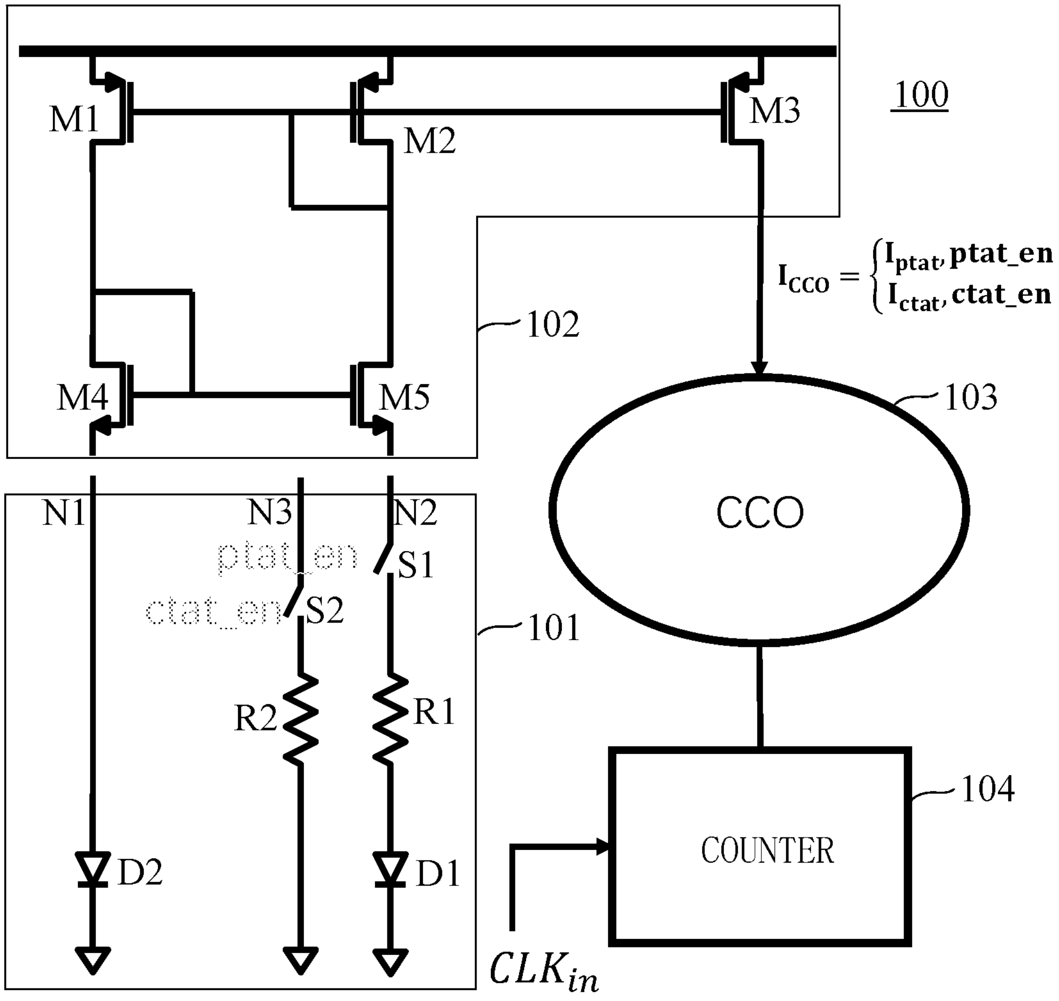
FIG. 1 is a schematic diagram of a temperature sensor circuit in an embodiment of the present application.

A temperature sensor circuit is provided in this embodiment and FIG. 1 shows a schematic diagram of a temperature sensor circuit 100 in an embodiment. The temperature sensor circuit 100 comprises a temperature sensing module 101, a current generator 102, a current controlled oscillator (CCO) 103, and a counter 104. The temperature sensing module 101 is sensitive to temperature changes. The current generator 102 generates a positive temperature coefficient current Iptat which is positively related to the temperature and a negative temperature coefficient current Ictat which is negatively related to the temperature respectively according to the temperature sensed by the temperature sensing module 101. The current controlled oscillator 103 oscillates according to the positive temperature coefficient current Iptat and the negative temperature coefficient current Ictat respectively, and outputs a positive temperature coefficient oscillation signal and a negative temperature coefficient oscillation signal. The counter 104 receives a clock signal CLKin and calculates a first period accumulation number of the positive temperature coefficient oscillation signal and a second period accumulation number of the negative temperature coefficient oscillation signal in the same number (for example, N) of clock signal periods, respectively, and acquires a temperature value based on the first period accumulation number and the second period accumulation number.

In one embodiment, the temperature sensing module 101 comprises at least two transistors, a first resistor and a second resistor, one of the at least two transistors is connected to a first node, the remaining transistors are connected to one terminal of the first resistor, the other terminal of the first resistor is connected to a second node, one terminal of the second resistor is connected to a third node, and the other terminal of the second resistor is connected to a ground. The temperature sensing module 101 comprises two transistors (a first transistor D1 and a first transistor D2) as an example in FIG. 1. One terminal of the second transistor D2 is connected to the first node N1 and the other terminal is connected to the ground. One terminal of the first transistor D1 is connected to the first resistor R1 and the other terminal is connected to the ground.

It should be noted that in this embodiment the transistor is implemented by a bipolar junction transistor (BJT) and in other embodiments the transistor may also be replaced by a diode.

In one embodiment, the current generator 102 comprises a first MOS transistor M1, a second MOS transistor M2, a third MOS transistor M3, a fourth MOS transistor M4, and a fifth MOS transistor M5. Sources of the first MOS transistor M1, the second MOS transistor M2, and the third MOS transistor M3 are coupled to a voltage source. Gates of the first MOS transistor M1, the second MOS transistor M2, the third MOS transistor M3 are coupled to a drain of the fifth MOS transistor M5. A drain of the first MOS transistor M1, a drain of the fourth MOS transistor M4, a gate of the fourth MOS transistor M4 and a gate of the fifth MOS transistor M5 are connected, and a drain of the second MOS transistor M2 is coupled to a drain of the fifth MOS transistor M5. A source of the fourth MOS transistor M4 is coupled to the first node N1. When a source of the fifth MOS transistor M5 is coupled to the second node N2, a drain of the third MOS transistor M3 outputs the negative temperature coefficient current Ictat to the current controlled oscillator 103. When the source of the fifth MOS transistor M5 is coupled to the third node N3, the drain of the third MOS transistor M3 outputs the positive temperature coefficient current Iptat to the current controlled oscillator 103.

In one embodiment, the positive temperature coefficient current Iptat is positively linearly related to the temperature and the negative temperature coefficient current Ictat is negatively linearly related to the temperature.

Figure 3:
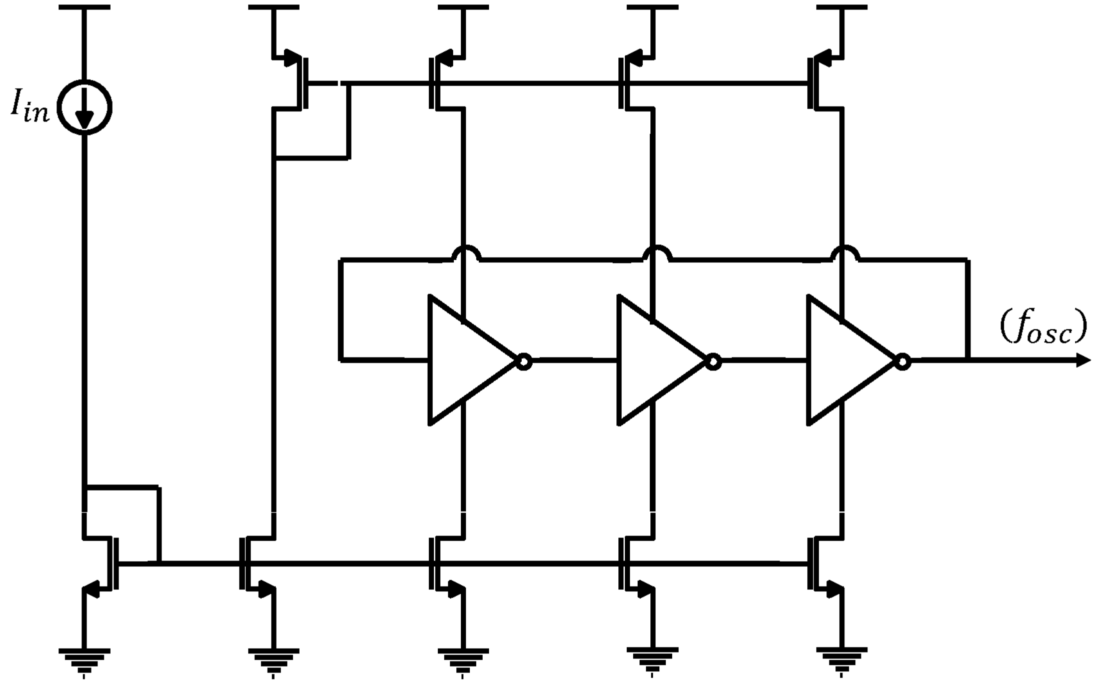
FIG. 3 is a schematic diagram of a current controlled oscillator in an embodiment of the present application.

FIG. 3 shows a schematic diagram of a current controlled oscillator in one embodiment of the present invention. FIG. 3 is a schematic diagram of a current starved ring oscillator through which an input current Iin outputs an oscillation signal fosc. The ring oscillator of FIG. 3 can achieve better linearity through on-chip calibration.

Figure 4:
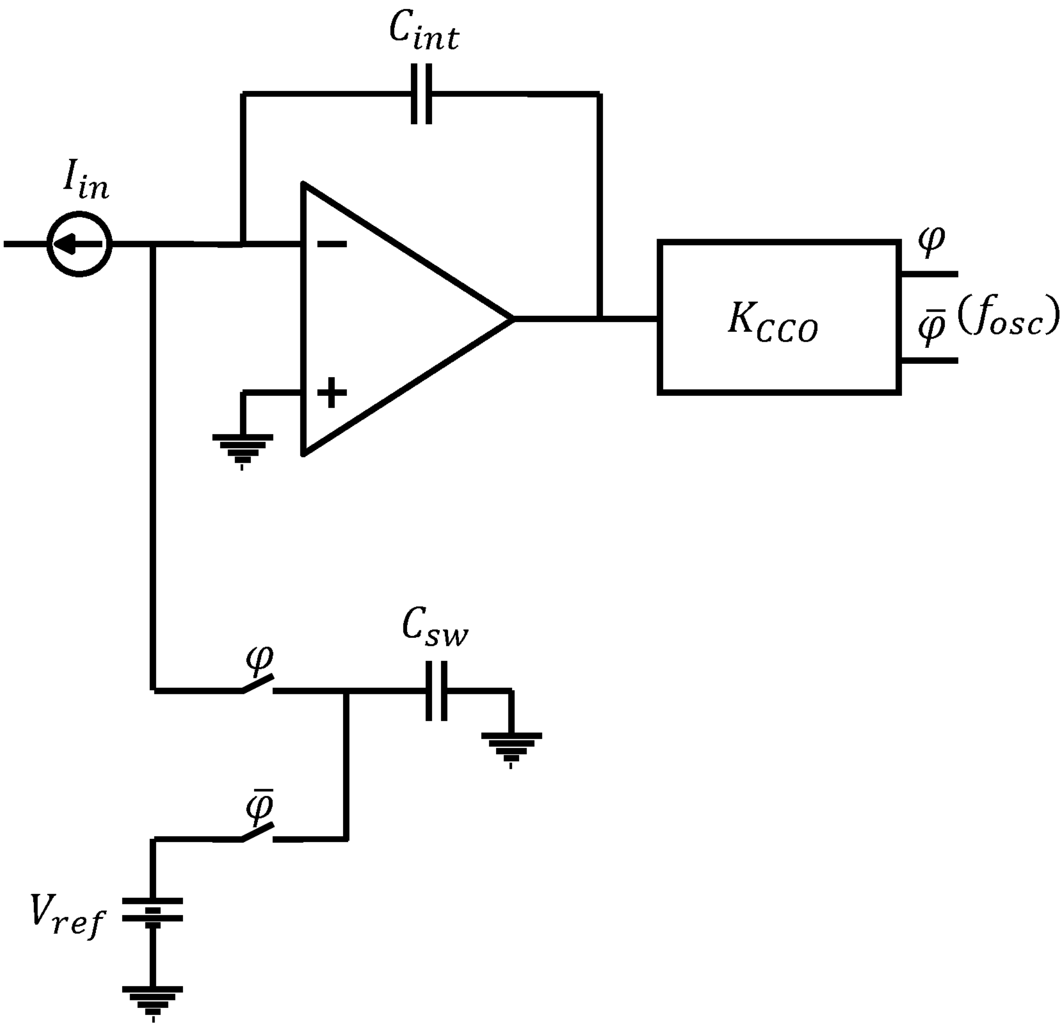
FIG. 4 is a schematic diagram of a current controlled oscillator in another embodiment of the present application.

FIG. 4 shows a schematic diagram of a current controlled oscillator in one embodiment of the present invention. FIG. 4 is a linear current controlled oscillator with feedback, and the oscillation signal $$f_{osc} = \frac{I_{in}}{C_{sw} V_{ref}},$$

$C_{sw}$ is the feedback capacitor, $V_{ref}$ is the reference voltage.

Figure 2:
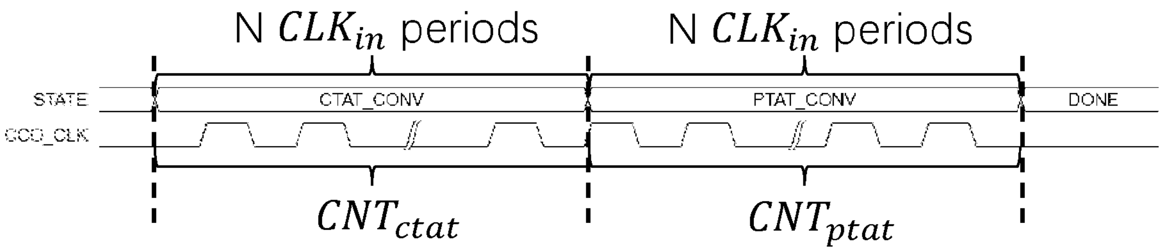
FIG. 2 is a waveform state diagram of a temperature sensor in an embodiment of the present application.

The working process of the temperature sensor circuit 100 will be described in detail below. Referring to FIGS. 1 and 2, FIG. 2 shows a waveform state diagram of the temperature sensor in one embodiment. In one embodiment, sequentially performing the conversion of the negative temperature coefficient current and the positive temperature coefficient current, and the counter 104 calculates the period accumulation numbers of oscillation signals of the current controlled oscillator corresponding to the negative temperature coefficient current and the positive temperature coefficient current in the same number of clock periods. The period accumulation numbers are linearly related to negative temperature coefficient current and positive temperature coefficient current respectively, so the temperature value is calculated according to the period accumulation numbers.

Firstly, a first switch S1 is controlled to open by the positive temperature coefficient enable signal ptat_en and a second switch S2 is controlled to close by the negative temperature coefficient enable signal ctat_en, for example, the positive temperature coefficient enable signal ptat_en is set to a low level and the negative temperature coefficient enable signal ctat_en is set to a high level. The second transistor D2 senses a temperature change and generates a negative temperature coefficient current Ictat through the current generator 102, and the current controlled oscillator 103 oscillates to generate a negative temperature coefficient oscillation signal based on the negative temperature coefficient current Ictat. The counter 104 receives the clock signal CLKin and calculates a second period accumulation number CNTctat of the negative temperature coefficient oscillation signal over N clock periods.

In one embodiment, the oscillation frequency of the current controlled oscillator 103 is linearly related to the current value, that is, the oscillation frequency of the current controlled oscillator 103 is linearly related to the positive temperature coefficient current Iptat and the negative temperature coefficient current Ictat. Therefore, the period accumulation number can be obtained by $CNT_{ctat} \approx K_{cco} I_{ctat}$ Wherein, $K_{cco}$ is the proportional factor of the current controlled oscillator 103 to the current value.

Then, the first switch S1 is controlled to close by the positive temperature coefficient enable signal ptat_en and the second switch S2 is controlled to open by the negative temperature coefficient enable signal ctat_en, for example, the positive temperature coefficient enable signal ptat_en is set to a high level and the negative temperature coefficient enable signal ctat_en is set to a low level. The first transistor D2 senses a temperature change and generates a positive temperature coefficient current Iptat through the current generator 102, and the current controlled oscillator 103 oscillates to generate a positive temperature coefficient oscillation signal based on the positive temperature coefficient current Iptat. The counter 104 receives the clock signal CLKin and calculates a first period accumulation number CNTptat of the positive temperature coefficient oscillation signal in the same N clock periods. Similarly, it can be concluded that $CNT_{ptat} \approx K_{cco} I_{ptat}$.

Finally, calculating the ratio μ linearly correlated with the temperature value according to the period accumulation numbers CNTctat and CNTptat, calculating the temperature value according to and the calculation formula of μ is as follows:

$$\mu = \frac{CNT_{ptat}}{CNT_{ptat} + CNT_{ctat}} \approx \frac{K_{cco} I_{ptat}}{K_{cco} I_{ptat} + K_{cco} I_{ctat}} \propto Temp$$

The temperature sensor circuit of the present invention utilizes a time domain current controlled oscillator instead of a traditional voltage domain integrator to improve conversion speed, while fully benefiting from time multiplexing, providing additional flexibility for modern SoC.

It should be understood that in other embodiments the temperature sensing module 101 comprises more (M) transistors, e.g., 4, 6, 9, and the like. One of the transistors is connected to the first node N1, and the remaining transistors are connected to the second node N2. During the operation of the temperature sensor 100, one of the M transistors is connected to the first node N1 in turn, and the remaining transistors are connected to the second node N2. For example, the connection relationship is rotated once in a clock signal cycle, all transistors are connected to the first node N1 once after M clock cycles, and the counter calculates the period accumulation number of M clock cycles. In these embodiments, each transistor is rotated in turn, which can realize dynamic element matching and avoid mismatch caused by a single element.

Embodiment II

Figure 5:
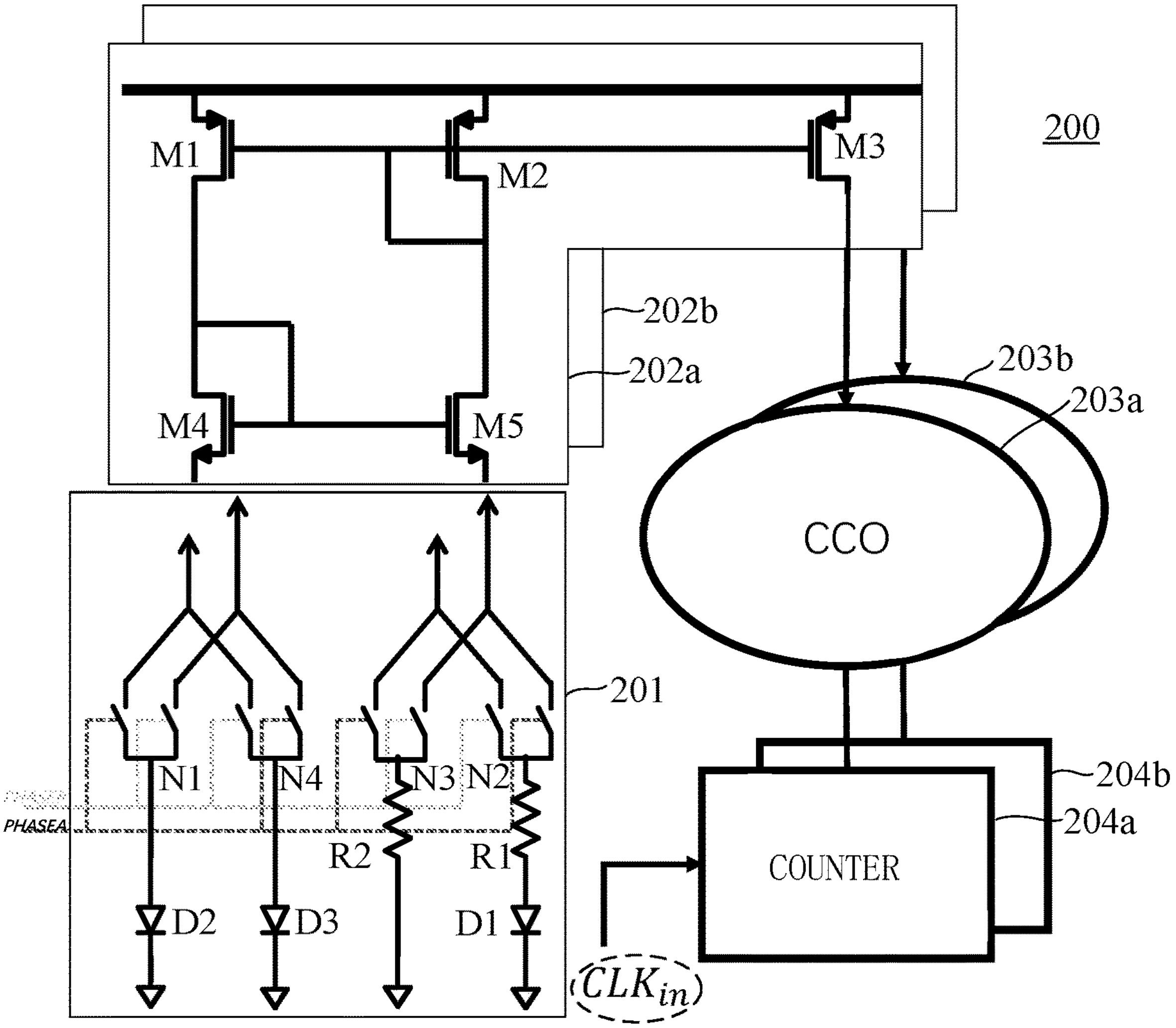
FIG. 5 is a schematic diagram of a temperature sensor circuit in another embodiment of the present application.

FIG. 5 shows a schematic diagram of a temperature sensor circuit 200 in one embodiment. The temperature sensor circuit 200 comprises a temperature sensing module 201, a first current generator 202*a*, a second current generator 202*b*, a first current controlled oscillator 203*a*, a second current controlled oscillator 203*b*, a first counter 204*a*, and a second counter 204*b*. The circuit configurations of the first current generator 202*a* and the second current generator 202*b* are the same as those of the current generator 102 shown in FIG. 1. The circuit configuration of the first current controlled oscillator 203*a* and the second current controlled oscillator 203*b* are the same as those of the current controlled oscillator 103 shown in FIG. 1. The circuit configuration of the first counter 204*a* and the second counter 204*b* is the same as those of the counter 104 shown in FIG. 1.

In one embodiment, the temperature sensing module 201 comprises a plurality of transistors and a first and second resistors. One of the plurality of transistors is connected to the first node, another transistor is connected to the fourth node, the remaining transistors are connected to one terminal of the first resistor, the other terminal of the first resistor is connected to the second node, one terminal of the second resistor is connected to the third node, and the other terminal is connected to a ground. In FIG. 3, the temperature sensing module 201 comprises three transistors (a first transistor D1, a first transistor D2, and a first transistor D3). One terminal of the second transistor D2 is connected to the first node N1 and the other terminal of the second transistor D2 is connected to a ground. One terminal of the first transistor D1 is connected to the first resistor R1 and the other terminal of the first transistor D1 is connected to the ground, and one terminal of the third transistor D3 is connected to the fourth node N4 and the other terminal of the third transistor D3 is connected to the ground.

In this embodiment, when the first current generator 202*a* generates a first negative temperature coefficient current Ictata negatively related to the temperature according to the temperature sensed by the temperature sensing module 201, the second current generator 202*b* generates a first positive temperature coefficient current Iptatb positively related to the temperature according to the temperature sensed by the temperature sensing module 201. The first current controlled oscillator 203*a* oscillates according to the first negative temperature coefficient current Ictata and outputs a first negative temperature coefficient oscillation signal, and the second current controlled oscillator 203*b* oscillates according to the first positive temperature coefficient current Iptatb and outputs a first positive temperature coefficient oscillation signal. When the first current generator 202*a* generates a second positive temperature coefficient current Iptata positively related to the temperature according to the temperature sensed by the temperature sensing module 201, the second current generator 202*b* generates a second negative temperature coefficient current Ictatb negatively related to the temperature according to the temperature sensed by the temperature sensing module. When the first current controlled oscillator 203*a* oscillates according to the second positive temperature coefficient current Iptata and outputs a second positive temperature coefficient oscillation signal, the second current controlled oscillator 203*b* oscillates according to the second negative temperature coefficient current Ictatb and outputs a second negative temperature coefficient oscillation signal.

Figure 6:
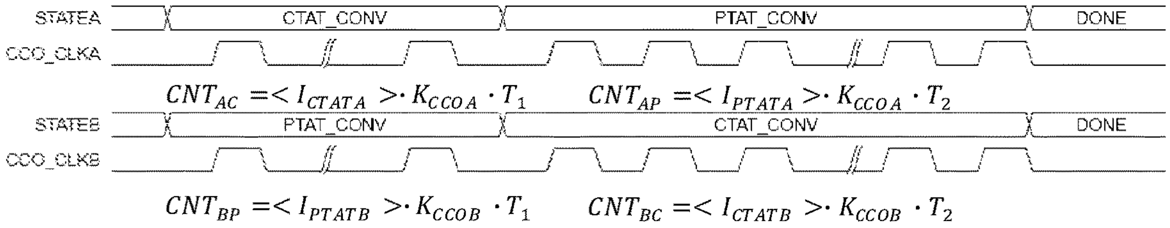
FIG. 6 is a waveform state diagram of a temperature sensor in another embodiment of the present application.

In particular with reference to FIGS. 5 and 6, FIG. 6 shows a waveform state diagram of a temperature sensor in one embodiment. Firstly, entering in stage A, the first node N1 is connected to the source of the fourth transistor M4 of the first current generator 202*a*, the third node N3 is connected to the source of the fifth transistor M5 of the first current generator 202*a*, the fourth node N4 is connected to the source of the fourth transistor M4 of the second current generator 202*b*, and the second node N2 is connected to the source of the fifth transistor M5 of the second current generator 202*b*, at which time the first current generator 202*a* generates a first negative temperature coefficient current Ictata and the second current generator 202*b* generates a first positive temperature coefficient current Iptatb.

When the first current controlled oscillator 203*a* oscillates according to the first negative temperature coefficient current Ictata and outputs the first negative temperature coefficient oscillation signal, the second current controlled oscillator 203*b* oscillates according to the first positive temperature coefficient current Iptatb and outputs the first positive temperature coefficient oscillation signal. The first counter 204*a* receives the clock signal CLKin and calculates a first period accumulation number $CNT_{AC}$ of the first negative temperature coefficient oscillation signal in N1 clock signal periods, the second counter 204*b* receives the clock signal CLKin and calculates a second period accumulation number $CNT_{BP}$ of the first positive temperature coefficient oscillation signal within the same N1 clock signal periods. The calculation formulas of the first accumulation number $CNT_{AC}$ and the second period accumulation number $CNT_{BP}$ are as follows, in which, $K_{CCOA}$ is a proportional coefficient of the current controlled oscillator 203*a* to the current value, $K_{CCOB}$ is a proportional coefficient of the current controlled oscillator 203*b* to the current value, $T_1$ is the time of N1 clock signal periods.

$$CNT_{AC}=\langle I_{CTATA}\rangle \cdot K_{CCOA} \cdot T_1$$

$$CNT_{BP}=\langle I_{PTATB}\rangle \cdot K_{CCOB} \cdot T_1$$

Then, entering in stage B, the fourth node N4 is connected to the source of the fourth transistor M4 of the first current generator 202*a*, the second node N2 is connected to the source of the fifth transistor M5 of the first current generator 202*a*, the first node N1 is connected to the source of the fourth transistor M4 of the second current generator 202*b*, and the third node N3 is connected to the source of the fifth transistor M5 of the second current generator 202*b*. At this time, the first current generator 202*a* generates a second positive temperature coefficient current Iptata and the second current generator 202*b* generates a second negative temperature coefficient current Ictatb. It should be noted that the second negative temperature coefficient current is equal to the first negative temperature coefficient current and the second positive temperature coefficient current is equal to the first positive temperature coefficient current.

The first current controlled oscillator 203*a* oscillates according to the second positive temperature coefficient current Iptata and outputs a second positive temperature coefficient oscillation signal, and the second current controlled oscillator 203*b* oscillates according to the second negative temperature coefficient current Ictatb and outputs a second negative temperature coefficient oscillation signal. The first counter 204*a* receives the clock signal CLKin and calculates a third period accumulation number $CNT_{AP}$ of the second positive temperature coefficient oscillation signal in N2 clock signal periods, the second counter 204*b* receives the clock signal CLKin and calculates the fourth period accumulation number $CNT_{BC}$ of the second negative temperature coefficient oscillation signal within the same N2 clock signal periods. The calculation formulas of the third period accumulation number $CNT_{AP}$ and the fourth period accumulation number $CNT_{BC}$ are as follows, in which, $T_2$ is the time of N2 clock signal cycles.

$$CNT_{AP}=\langle I_{PTATA}\rangle \cdot K_{CCOA} \cdot T_2$$

$$CNT_{BC}=\langle I_{CTATB}\rangle \cdot K_{CCOB} \cdot T_2$$

Finally, obtaining the temperature value based on the first period accumulation number $CNT_{AC}$, the second period accumulation number $CNT_{BP}$, the third period accumulation number $CNT_{AP}$, and the fourth period accumulation number $CNT_{BC}$. Finally, calculating the ratio μ linearly correlated with the temperature value according to the period accumulation numbers, and calculating the temperature value according to and the calculation formula of μ is as follows:

$$\mu = \frac{k}{1+k}$$

$$k = \frac{\langle I_{PTAT}\rangle}{\langle I_{CTAT}\rangle} \approx \sqrt{\frac{CNT_{BP}}{CNT_{AC}}\frac{CNT_{AP}}{CNT_{BC}}}$$

It should be understood that in other embodiments, the temperature sensing module 201 comprises more (M) transistors, one of which is connected to the first node N1, one of which is connected to the fourth node N4, and the remaining transistors are connected to the second node N2. In addition, the temperature sensor 200 switches M transistors among the first node, the fourth node, and the second node in turn during the operation of the temperature sensor 200. For example, the connection relationship is rotated once in a clock signal cycle, all transistors are connected to the first node N1, the fourth node N4 and the second node N2 once after M clock cycles, and the counter calculates the period accumulation number of M clock cycles. It should be understood that each transistor rotates in turn, so that the generated negative temperature coefficient current and positive temperature coefficient current are average currents, which can realize dynamic element matching and avoid mismatch caused by single element.

Embodiment III

The structure of the temperature sensor in this embodiment is basically the same as that of the temperature sensor shown in FIG. 5, with the main difference that the clock signal CLKin is not required for the first counter 204*a* and the second counter 204*b* in this embodiment. From the above formula for calculating k, it can be seen that k has nothing to do with the period of the clock signal CLKin. Therefore, the first counter 204*a* and the second counter 204*b* do not need the clock signal CLKin. The counters 204*a* and 204*b* calculate the period accumulation numbers of the negative temperature coefficient oscillation signal and the positive temperature coefficient oscillation signal in the same time according to the time period of the oscillation signal outputted from the current controlled oscillator 203*a* and 203*b*, respectively, and obtain the first period accumulation number of the first negative temperature coefficient oscillation signal $CNT_{AC}$, the second period accumulation number of the first positive temperature coefficient oscillation signal $CNT_{BP}$, the third period accumulation number of the second positive temperature coefficient oscillation signal $CNT_{AP}$, and the fourth period accumulation number of the second negative temperature coefficient oscillation signal $CNT_{BC}$, and using the same method as before calculating the temperature value according to the first period accumulation number $CNT_{AC}$, the second period accumulation number $CNT_{BP}$, the third period accumulation number $CNT_{AP}$ and the fourth period accumulation number $CNT_{BC}$.

Embodiment IV

Figure 7:
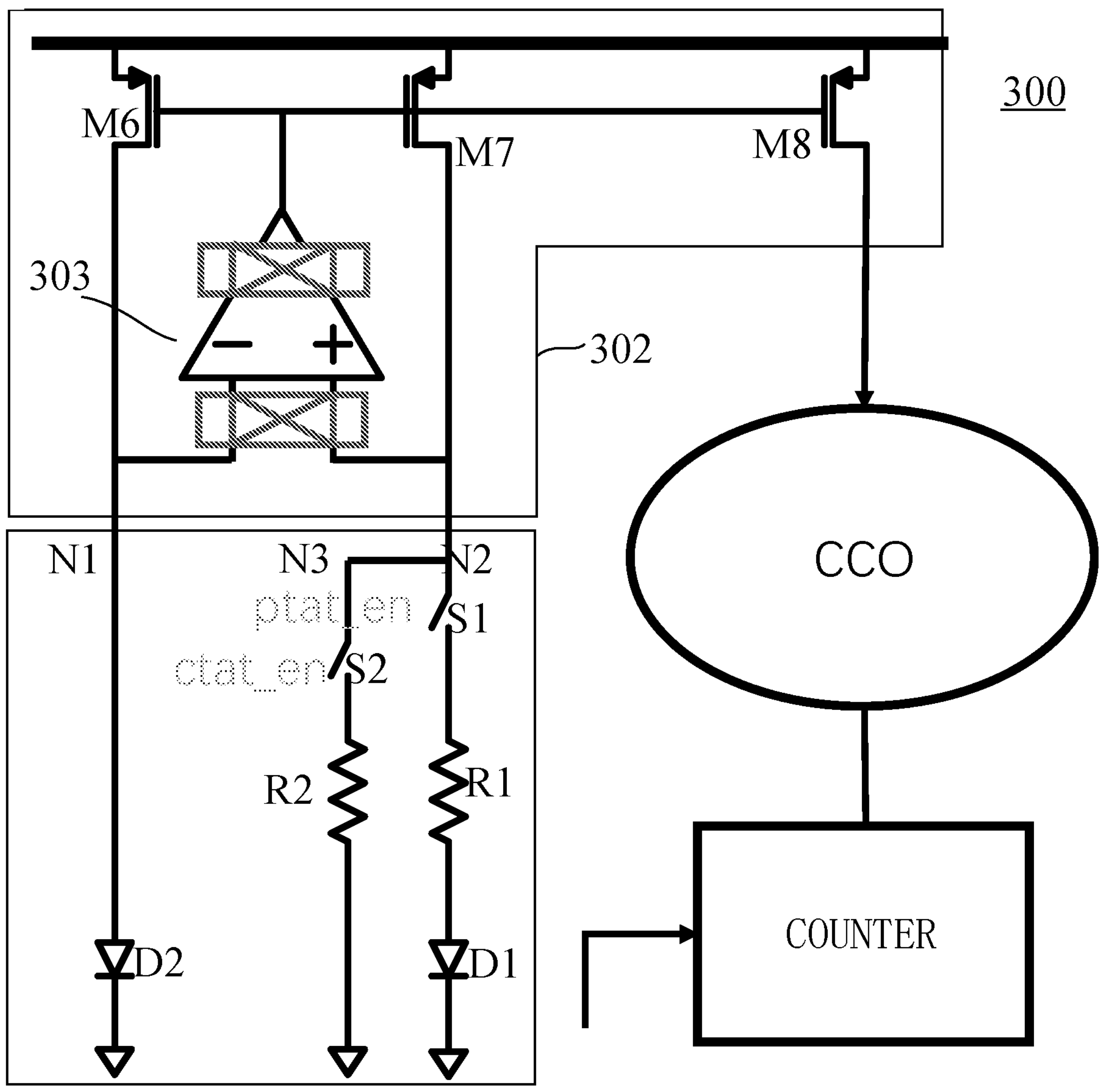
FIG. 7 is a schematic diagram of a current generator in another embodiment of the present application.

Referring to FIG. 7, the temperature sensor 300 in this embodiment is basically the same as the temperature sensor 100 shown in FIG. 1, with the main difference that the current generator 302 comprises a sixth MOS transistor M6, a seventh MOS transistor M7, an eighth MOS transistor M8 and a chopper amplifier 303. Sources of the sixth MOS transistor M6, the seventh MOS transistor M7, and the eighth MOS transistor M8 are coupled to a voltage source. Gates of the sixth MOS transistor M6, the seventh MOS transistor M7, and the eighth MOS transistor M8 are coupled to an output of the chopper amplifier 303. A drain of the sixth MOS transistor M6 is connected to an inverting input of the chopper amplifier 303, and a drain of the seventh MOS transistor M7 is connected to a non-inverting input of the chopper amplifier 303. The inverting input of the chopper amplifier 303 is coupled to the first node N1, and the non-inverting input of the chopper amplifier 303 is coupled to the second node N2 or the third node N3. A drain of the eighth MOS transistor M8 outputs the positive temperature coefficient current Iptata and the negative temperature coefficient current Ictata.

It should be understood that the current generator 302 in FIG. 7 may also be used in conjunction with the temperature sensor 200 in FIG. 5.

In an embodiment of the present invention, there is provided a temperature sensor circuit which comprises: a temperature sensing module which is sensitive to temperature changes; a current generator, configured to generate a positive temperature coefficient current positively related to the temperature and a negative temperature coefficient current negatively related to the temperature according to the temperature sensed by the temperature sensing module respectively; a current controlled oscillator, configured to oscillate according to the positive temperature coefficient current and the negative temperature coefficient current respectively, and output a positive temperature coefficient oscillation signal and a negative temperature coefficient oscillation signal; and a counter, configured to receive a clock signal and calculate a first period accumulation number of the negative temperature coefficient oscillation signal and a second period accumulation number of the positive temperature coefficient oscillation signal in the same number of clock signal periods respectively, and acquire a temperature value based on the first period accumulation number and the second period accumulation number.

In one embodiment, the temperature sensing module comprises at least two transistors, a first resistor, and a second resistor, one of the at least two transistors is connected to a first node, the remaining transistors are connected to one terminal of the first resistor, the other terminal of the first resistor is connected to a second node, one terminal of the second resistor is connected to a third node, and the other terminal of the second resistor is connected to a ground.

In one embodiment, the current generator comprises a first MOS transistor, a second MOS transistor, a third MOS transistor, a fourth MOS transistor, and a fifth MOS transistor, wherein sources of the first to third MOS transistors are coupled to a voltage source; gates of the first to third MOS transistors are coupled to a drain of the fifth MOS transistor; a drain of the first MOS transistor, a drain of the fourth MOS transistor, and gates of the fourth and fifth MOS transistors are connected; and a drain of the second MOS transistor is coupled to the drain of the fifth MOS transistor; a source of the fourth MOS transistor is coupled to the first node; a source of the fifth MOS transistor is coupled to the second node or the third node; a drain of the third MOS transistor outputs the positive temperature coefficient current and the negative temperature coefficient current to the current controlled oscillator.

In one embodiment, the current generator comprises a sixth MOS transistor, a seventh MOS transistor, an eighth MOS transistor and a chopper amplifier, wherein sources of the sixth to eighth MOS transistors are coupled to a voltage source, gates of the sixth to eighth MOS transistors are coupled to an output of the chopper amplifier, a drain of the sixth MOS transistor is connected to the inverting input of the chopper amplifier, and a drain of the seventh MOS transistor is connected to the non-inverting input of the chopper amplifier; the inverting input of the chopper amplifier is coupled to the first node; the non-inverting input of the chopper amplifier is coupled to the second node or the third node; a drain of the eighth MOS transistor outputs the positive temperature coefficient current and the negative temperature coefficient current to the current controlled oscillator.

In one embodiment, the temperature value is proportional to $$\frac{CNT_{ptat}}{CNT_{ptat}+CNT_{ctat}},$$

wherein, $CNT_{ctat}$ is the first period accumulation number, $CNT_{ptat}$ is the second period accumulation number.

In one embodiment, the positive temperature coefficient current is positively linearly related to the temperature and the negative temperature coefficient current is negatively linearly related to the temperature.

In one embodiment of the present invention, there is provided a temperature sensor circuit which comprises:

a temperature sensing module which is sensitive to temperature changes;

a first current generator and a second current generator, wherein when the first current generator generates a first negative temperature coefficient current negatively related to the temperature according to the temperature sensed by the temperature sensing module, the second current generator generates a first positive temperature coefficient current positively related to the temperature according to the temperature sensed by the temperature sensing module, and when the first current generator generates a second positive temperature coefficient current positively related to the temperature according to the temperature sensed by the temperature sensing module, the second current generator generates a second negative temperature coefficient current negatively related to the temperature according to the temperature sensed by the temperature sensing module;

a first current controlled oscillator and a second current controlled oscillator, wherein when the first current controlled oscillator oscillates according to the first negative temperature coefficient current and outputs the first negative temperature coefficient oscillation signal, the second current controlled oscillator oscillates according to the first positive temperature coefficient current and outputs the first positive temperature coefficient oscillation signal, and when the first current controlled oscillator oscillates according to the second positive temperature coefficient current and outputs a second positive temperature coefficient oscillation signal, the second current controlled oscillator oscillates according to the second negative temperature coefficient current and outputs a second negative temperature coefficient oscillation signal; and a first counter and a second counter, wherein when the first counter calculates the first period accumulation number of the first negative temperature coefficient oscillation signal, the second counter calculates the second period accumulation number of the first positive temperature coefficient oscillation signal, and when the first counter calculates the third period accumulation number of the second positive temperature coefficient oscillation signal, the second counter calculates the fourth period accumulation number of the second negative temperature coefficient oscillation signal, and a temperature value is acquired based on the first period accumulation number, the second period accumulation number, the third period accumulation number, and the fourth period accumulation number.

In one embodiment, the first counter and the second counter receive a clock signal and respectively calculate a first period accumulation number of the first negative temperature coefficient oscillation signal, a second period accumulation number of the first positive temperature coefficient oscillation signal, a third period accumulation number of the second positive temperature coefficient oscillation signal and a fourth period accumulation number of the second negative temperature coefficient oscillation signal in the same number of clock signal periods.

In one embodiment, the temperature value is proportional to $$\frac{k}{1+k},$$

wherein, $$k = \sqrt{\frac{CNT_{BP}}{CNT_{AC}}\frac{CNT_{AP}}{CNT_{BC}}},$$

$CNT_{AC}$ is the first period accumulation number, $CNT_{BP}$ is the second period accumulation number, $CNT_{AP}$ is the third period accumulation number, $CNT_{BC}$ is the fourth period accumulation number.

In one embodiment, the temperature sensing module comprises a plurality of transistors, a first resistor, and a second resistor, one of the plurality of transistors is connected to the first node, another transistor is connected to the fourth node, the remaining transistors are connected to one terminal of the first resistor, the other terminal of the first resistor is connected to the second node, one terminal of the second resistor is connected to the third node, and the other terminal is connected to a ground.

In one embodiment, the first current generator and the second current generator each comprise a first MOS transistor, a second MOS transistor, a third MOS transistor, a fourth MOS transistor, and a fifth MOS transistors, wherein sources of the first to third MOS transistors are coupled to a voltage source; gates of the first to third MOS transistors are coupled to a drain of the fifth MOS transistor; a drain of the first MOS transistor, a drain of the fourth MOS transistor, and gates of the fourth and fifth MOS transistors are connected; and a drain of the second MOS transistor is coupled to the drain of the fifth MOS transistor; a source of the fourth MOS transistor is coupled to the first node or the fourth node; a source of the fifth MOS transistor is coupled to the second node or the third node; a drain of the third MOS transistor outputs the positive temperature coefficient current and the negative temperature coefficient current.

In one embodiment, the first current generator and the second current generator each comprise a sixth MOS transistor, a seventh MOS transistor, an eighth MOS transistor and a chopper amplifier, wherein sources of the sixth to eighth MOS transistors are coupled to a voltage source, gates of the sixth to eighth MOS transistors are coupled to an output of the chopper amplifier, a drain of the sixth MOS transistor is connected to the inverting input of the chopper amplifier, and a drain of the seventh MOS transistor is connected to the non-inverting input of the chopper amplifier; the inverting input of the chopper amplifier is coupled to the first node or the fourth node; the non-inverting input of the chopper amplifier is coupled to the second node or the third node; a drain of the eighth MOS transistor outputs the positive temperature coefficient current and the negative temperature coefficient current.

In one embodiment, the first negative temperature coefficient current is equal to the second negative temperature coefficient current, and the first positive temperature coefficient current is equal to the second positive temperature coefficient current.

The temperature sensor provided by this disclosure has at least the following beneficial effects: The temperature sensor of this application provides additional flexibility for the modern SoC. In one embodiment, the temperature sensor utilizes a time domain current controlled oscillator instead of a conventional voltage domain integrator to improve the conversion speed while fully benefiting from time multiplexing. In another embodiment, a high-speed clockless on-chip temperature sensor is implemented with a small area and power overhead using two-time domain current controlled oscillators and a current generator of a dynamic bias circuit.

It should be noted that in the application documents of the present invention, relational terms such as a first and a second, and so on are only configured to distinguish one entity or operation from another entity or operation, and do not necessarily require or imply any such actual relationship or order between these entities or operations. Furthermore, the term “comprises” or “comprising” or “includes” or any other variations thereof is intended to encompass a non-exclusive inclusion, such that a process, method, item, or device that comprises a plurality of elements includes not only those elements but also other elements, or elements that are inherent to such a process, method, item, or device. Without more restrictions, the element defined by the phrase “comprises a/an” does not exclude that there are other identical elements in the process, method, item or device that comprises the element. In the application, if it is mentioned that an action is performed according to an element, it means the meaning of performing the action at least according to the element, and includes two cases: the behavior is performed only on the basis of the element, and the behavior is performed based on the element and other elements. Multiple, repeatedly, various, etc., expressions include 2, twice, 2 types, and 2 or more, twice or more, and 2 types or more types.

The term “coupled to” and its derivatives can be used herein. “Coupled” may mean that two or more elements are in direct physical or electrical contact. However, “coupled” may also mean that two or more elements are indirectly in contact with each other, but still cooperate or interact with each other, and may mean that one or more other elements are coupled between elements that are said to be coupled to or connected with each other.

The specification includes combinations of the various embodiments described herein. Separate references to embodiments (such as “one embodiment” or “some embodiments” or “preferred embodiments”) do not necessarily refer to the same embodiment; however, these embodiments are not mutually exclusive unless indicated as mutually exclusive or clearly mutually exclusive by those skilled in the art. It should be noted that unless the context clearly indicates or requires otherwise, the word “or” is used in this specification in a non-exclusive sense.

All documents mentioned in the application are considered to be included in the application of the disclosure as a whole, so that they can be used as a basis for modification when necessary. In addition, it should be understood that various changes and modifications may be made by those skilled in the art after reading the above disclosure of the present application.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A temperature sensor circuit, comprising:

a temperature sensing module which is sensitive to temperature changes;

a current generator configured to generate a positive temperature coefficient current positively related to temperature and a negative temperature coefficient current negatively related to temperature according to a temperature sensed by the temperature sensing module respectively;

a current controlled oscillator configured to oscillate according to the positive temperature coefficient current and the negative temperature coefficient current respectively, and to output a positive temperature coefficient oscillation signal and a negative temperature coefficient oscillation signal respectively; and a counter configured to receive a clock signal and calculate a first period accumulation number of the negative temperature coefficient oscillation signal and a second period accumulation number of the positive temperature coefficient oscillation signal in the same number of clock signal periods respectively, and to acquire a temperature value based on the first period accumulation number and the second period accumulation number, wherein the temperature sensing module comprises at least two transistors, a first resistor and a second resistor, each of the resistors having a first and a second terminal, one of the at least two transistors being connected to a first node, and the remaining transistors being connected to the first terminal of the first resistor, the second terminal of the first resistor being connected to a second node, the first terminal of the second resistor being connected to a third node, and the second terminal of the second resistor being connected to ground.

2. The temperature sensor circuit of claim 1, wherein the current generator comprises a first metal-oxide-semiconductor (MOS) transistor, a second MOS transistor, a third MOS transistor, a fourth MOS transistor, and a fifth MOS transistor, wherein:

sources of the first to third MOS transistors are coupled to a voltage source;

gates of the first to third MOS transistors are coupled to a drain of the fifth MOS transistor;

a drain of the first MOS transistor, a drain of the fourth MOS transistor, and gates of the fourth and fifth MOS transistors are connected;

a drain of the second MOS transistor is coupled to the drain of the fifth MOS transistor;

a source of the fourth MOS transistor is coupled to the first node;

a source of the fifth MOS transistor is coupled to the second node or the third node; and a drain of the third MOS transistor outputs the positive temperature coefficient current and the negative temperature coefficient current to the current controlled oscillator.

3. The temperature sensor circuit of claim 2, wherein the current generator comprises a sixth MOS transistor, a seventh MOS transistor, an eighth MOS transistor and a chopper amplifier, wherein:

sources of the sixth to eighth MOS transistors are coupled to a voltage source, gates of the sixth to eighth MOS transistors are coupled to an output of the chopper amplifier, a drain of the sixth MOS transistor is connected to the inverting input of the chopper amplifier, and a drain of the seventh MOS transistor is connected to the non-inverting input of the chopper amplifier;

the inverting input of the chopper amplifier is coupled to the first node;

the non-inverting input of the chopper amplifier is coupled to the second node or the third node; and a drain of the eighth MOS transistor outputs the positive temperature coefficient current and the negative temperature coefficient current to the current controlled oscillator.

4. The temperature sensor circuit of claim 1, wherein the temperature value is proportional to $$\frac{CNT_{ptat}}{CNT_{ptat} + CNT_{ctat}},$$

wherein, $CNT_{ctat}$ is the first period accumulation number and $CNT_{ptat}$ is the second period accumulation number.

5. The temperature sensor circuit of claim 1, wherein the positive temperature coefficient current is positively linearly related to the temperature and the negative temperature coefficient current is negatively linearly related to the temperature.

6. A temperature sensor circuit, comprising:

a temperature sensing module which is sensitive to temperature changes;

a first current generator and a second current generator configured such that when the first current generator generates a first negative temperature coefficient current negatively related to temperature according to a temperature sensed by the temperature sensing module, the second current generator generates a first positive temperature coefficient current positively related to temperature according to the temperature sensed by the temperature sensing module, and when the first current generator generates a second positive temperature coefficient current positively related to temperature according to the temperature sensed by the temperature sensing module, the second current generator generates a second negative temperature coefficient current negatively related to temperature according to the temperature sensed by the temperature sensing module;

a first current controlled oscillator and a second current controlled oscillator configured such that when the first current controlled oscillator oscillates according to the first negative temperature coefficient current and outputs the first negative temperature coefficient oscillation signal, the second current controlled oscillator oscillates according to the first positive temperature coefficient current and outputs the first positive temperature coefficient oscillation signal, and when the first current controlled oscillator oscillates according to the second positive temperature coefficient current and outputs a second positive temperature coefficient oscillation signal, the second current controlled oscillator oscillates according to the second negative temperature coefficient current and outputs a second negative temperature coefficient oscillation signal; and a first counter and a second counter configured such that when the first counter calculates the first period accumulation number of the first negative temperature coefficient oscillation signal, the second counter calculates the second period accumulation number of the first positive temperature coefficient oscillation signal, and when the first counter calculates the third period accumulation number of the second positive temperature coefficient oscillation signal, the second counter calculates the fourth period accumulation number of the second negative temperature coefficient oscillation signal, and a temperature value is acquired based on the first period accumulation number, the second period accumulation number, the third period accumulation number, and the fourth period accumulation number, wherein the temperature sensing module comprises a plurality of transistors, a first resistor and a second resistor, each of the resistors including a first terminal and a second terminal, a first one of the plurality of transistors being connected to a first node, another one of the plurality of transistors being connected to a fourth node, and the remaining transistors being connected to the first terminal of the first resistor, the second terminal of the first resistor being connected to a second node, the first terminal of the second resistor being connected to a third node, and the second terminal of the second resistor being connected to ground.

7. The temperature sensor circuit of claim 6, wherein the first counter and the second counter receive a clock signal and respectively calculate a first period accumulation number of the first negative temperature coefficient oscillation signal, a second period accumulation number of the first positive temperature coefficient oscillation signal, a third period accumulation number of the second positive temperature coefficient oscillation signal and a fourth period accumulation number of the second negative temperature coefficient oscillation signal in the same number of clock signal periods.

8. The temperature sensor circuit of claim 6, wherein the temperature value is proportional to $$\frac{k}{1+k},$$

wherein, $$k = \sqrt{\frac{CNT_{BP}}{CNT_{AC}}\frac{CNT_{AP}}{CNT_{BC}}},$$

$CNT_{AC}$ is the first period accumulation number, $CNT_{BP}$ is the second period accumulation number, $CNT_{AP}$ is the third period accumulation number, $CNT_{BC}$ is the fourth period accumulation number.

9. The temperature sensor circuit of claim 6, wherein the first current generator and the second current generator each comprise a first metal-oxide-semiconductor (MOS) transistor, a second MOS transistor, a third MOS transistor, a fourth MOS transistor, and a fifth MOS transistor, wherein:

sources of the first to third MOS transistors are coupled to a voltage source;

gates of the first to third MOS transistors are coupled to a drain of the fifth MOS transistor;

a drain of the first MOS transistor, a drain of the fourth MOS transistor, and gates of the fourth and fifth MOS transistors are connected together;

a drain of the second MOS transistor is coupled to the drain of the fifth MOS transistor;

a source of the fourth MOS transistor is coupled to the first node or the fourth node;

a source of the fifth MOS transistor is coupled to the second node or the third node; and a drain of the third MOS transistor outputs the positive temperature coefficient current and the negative temperature coefficient current.

10. The temperature sensor circuit of claim 6, wherein the first current generator and the second current generator each comprise a sixth MOS transistor, a seventh MOS transistor, an eighth MOS transistor and a chopper amplifier, wherein:

sources of the sixth to eighth MOS transistors are coupled to a voltage source, gates of the sixth to eighth MOS transistors are coupled to an output of the chopper amplifier, a drain of the sixth MOS transistor is connected to an inverting input of the chopper amplifier, and a drain of the seventh MOS transistor is connected to the non-inverting input of the chopper amplifier;

the inverting input of the chopper amplifier is coupled to the first node or the fourth node;

the non-inverting input of the chopper amplifier is coupled to the second node or the third node;

a drain of the eighth MOS transistor outputs the positive temperature coefficient current and the negative temperature coefficient current.

11. The temperature sensor circuit of claim 6, wherein the first negative temperature coefficient current is equal to the second negative temperature coefficient current, and the first positive temperature coefficient current is equal to the second positive temperature coefficient current.

12. A temperature sensor circuit, comprising:

a temperature sensing module which is sensitive to temperature changes;

a current generator configured to generate a positive temperature coefficient current positively related to temperature and a negative temperature coefficient current negatively related to temperature according to a temperature sensed by the temperature sensing module respectively;

a current controlled oscillator configured to oscillate according to the positive temperature coefficient current and the negative temperature coefficient current respectively, and to output a positive temperature coefficient oscillation signal and a negative temperature coefficient oscillation signal respectively; and a counter configured to receive a clock signal and calculate a first period accumulation number of the negative temperature coefficient oscillation signal and a second period accumulation number of the positive temperature coefficient oscillation signal in the same number of clock signal periods respectively, and to acquire a temperature value based on the first period accumulation number and the second period accumulation number, wherein the temperature value is proportional to $$\frac{CNT_{ptat}}{CNT_{ptat} + CNT_{ctat}},$$

wherein, $CNT_{ctat}$ is the first period accumulation number and $CNT_{ptat}$ is the second period accumulation number.

* * * * *